United States Patent [19]

Gray

[11] Patent Number: 4,610,620
[45] Date of Patent: Sep. 9, 1986

[54] APPARATUS FOR MOLDING PLURAL COLORED PLASTIC HOLLOW SHELLS

[75] Inventor: John D. Gray, Durham, N.H.

[73] Assignee: Ex-Cell-O Corporation, Troy, Mich.

[21] Appl. No.: 652,379

[22] Filed: Sep. 20, 1984

[51] Int. Cl.$^4$ .................. B29C 41/04; B29C 41/22
[52] U.S. Cl. ...................... 425/434; 425/425
[58] Field of Search ............... 425/425, 427, 429, 430, 425/435, 434; 264/255

[56] References Cited

U.S. PATENT DOCUMENTS

| 178,308 | 6/1876 | Leathers et al. | 264/245 |
|---|---|---|---|
| 2,115,249 | 4/1938 | Bowman | 264/255 |
| 2,950,505 | 8/1960 | Frank | 264/255 |
| 3,796,622 | 3/1974 | Brody | 264/245 |
| 4,076,567 | 2/1978 | Yoshikawa et al. | 264/126 |
| 4,157,883 | 6/1979 | Mares | 264/255 |
| 4,191,726 | 3/1980 | Stillhard et al. | 264/126 |
| 4,275,028 | 6/1981 | Cohen | 264/126 |
| 4,355,068 | 8/1982 | Hemery | 264/245 |
| 4,405,539 | 9/1983 | Schulte et al. | 264/245 |
| 4,460,530 | 7/1984 | Hanson et al. | 264/126 |

FOREIGN PATENT DOCUMENTS

| 675434 | 12/1963 | Canada | 264/126 |
|---|---|---|---|
| 0108870 | 8/1979 | Japan | 264/250 |
| 0057727 | 4/1984 | Japan | 264/250 |

Primary Examiner—Willard E. Hoag
Attorney, Agent, or Firm—John C. Evans

[57] ABSTRACT

Apparatus for manufacturing pin-stripe or common color thin-walled hollow shells for parts such as automobile door panels, controls and instrument panels from dry thermo-plastic powders include a powder box divider to form two or more compartments in a powder charge box and means for joining the charge box divider end-to-end with a mold separation edge on an open-ended heated mold for separating the mold into two or more sections; each compartment of the charge box has a different color powder. The charge box and mold are joined and then are rotated so that the powder is distributed into each mold section by gravity flow. Thereafter a third powder is distributed against an exposed division surface on the mold separation edge so as to form a pin stripe or common color for bonding prior cast multi-colored sections of a resultant shell of cured material.

2 Claims, 8 Drawing Figures

U.S. Patent  Sep. 9, 1986  4,610,620
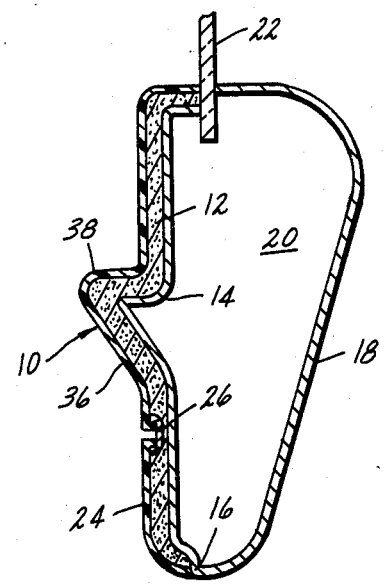
FIG. 1
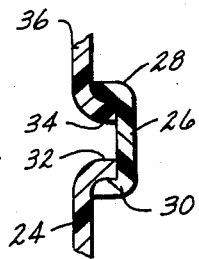
FIG. 2
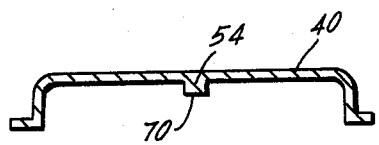
FIG. 3
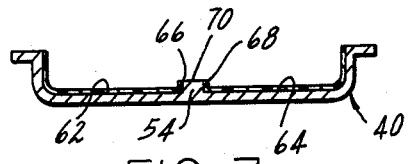
FIG. 6
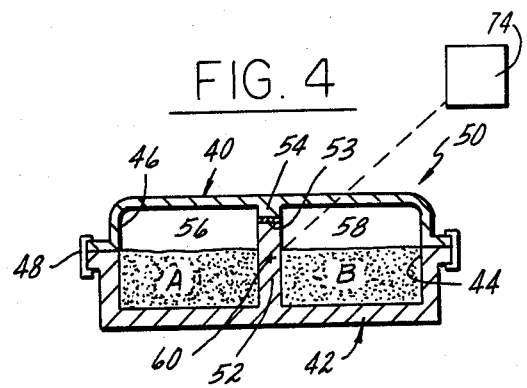
FIG. 4
FIG. 7
FIG. 8
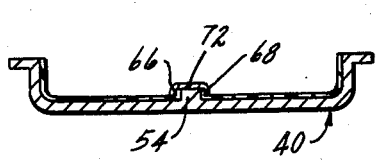
FIG. 5

4,610,620

APPARATUS FOR MOLDING PLURAL COLORED PLASTIC HOLLOW SHELLS

TECHNICAL FIELD

This invention pertains to an improved plastic shell and a method and apparatus for making such articles especially suitable for use in automobile trim components such as interior door or instrument panels and more particularly to two-tone plastic shells and method and apparatus for processing plastic powder to form such articles to have two or more tone colors with a pin-stripe or matching color connecting the color sections at a bond joint.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired particularly in the interior design of automobiles.

The current state of the art includes a pre-formed grained vinyl shell made from dry thermoplastic powder particles which are applied to a heated shell mold from a powder box to form a continuous monochromatic one-piece shell.

In order to enhance the interior decor of an automobile, interior door panels and other parts have been prepared which include two separate plastic shell sections The use of multi-color plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

U.S. Pat. No. 3,028,283 issued Apr. 3, 1962 discloses a golf grip of multi-color strips with a separating bead simulating a paint stripe.

Apparatus and method for multiple colored thermoplastic floor materials are set forth in U.S. Pat. No. 3,383,442 issued May 14, 1968.

U.S. application Ser. No. 614,004 filed May 25, 1984, with a common assignee to the present application, covers a Mold Method and Apparatus for Multi-Color Plastic Shells in which shell segments have their edges bonded at a common break-line.

The aforesaid methods and apparatus for manufacture or resultant manufacture are not directed to a process or apparatus for manufacturing a single piece shell suitable for use as an interior panel component of an automobile with a pin-stripe or overlapping color connector for bonding two or more shell sections.

STATEMENT OF INVENTION AND ADVANTAGES

In accordance with the present invention a process and apparatus for loading an open-ended heated mold with powder vinyl material includes the process of releasing a precharge of two or more colors of thermoplastic powder from separate compartments in a charge box means for gravity flow into a mold with means configured to produce two shell segments and thereafter providing a pin-stripe or overlapping color connector to bond the shell segments to form a one-piece shell with two or more color tones to enhance the decor of the interior of an automobile.

An open-ended charge box means is provided with divider means to form two or more separate compartments; each of which is filled with a predetermined quantity of different color powder. The loaded open-ended charge box means is clamped to an open-ended mold with a net condition seal to form a closed system. The mold's net condition seal cooperates with the divider means to separate the powder content in each compartment of the charge box means. The closed system is rotated so that the charge box releases the powder from the separate charge box compartments to flow evenly across the open end of the mold by gravity and against the seal so as to produce a multi-piece shell across heated surfaces of the mold. Thereafter the tooling is rotated and the powder box is removed. The mold is rotated to face upwardly and joint powder is distributed against an exposed heated surface of the mold to form a pin-stripe or common color connector that bonds the previously cast multi-pieces to form distinct colors in a single-piece article with an integral pin-stripe of a complementary color or common color to the joined segments.

Plastics molding apparatus of the invention has a gravity fill system for flow of powder material into a heated mold to form a thin walled multi-piece plastic part of multi-color and for return of excess powder material from the mold including charge box means having a plurality of separate compartments; each filled with a different color plastic powder and each extending across an open end of the powder box means; means for coupling the powder box to the mold and for partitioning the mold to receive a single color plastic powder at each of a plurality of separate surface regions on the mold; means for operating the coupled box and mold to dispose the charge box with respect to the mold for gravity flow of powder from each of the separate powder box compartments into the partitioned mold so that flow of powder into the mold covers uniformly heated separate surfaces of the mold with a different color of plastic; the mold having an exposed heated surface disposed to receive joint material to form a pin-stripe or common color connector that bonds previously formed multi-pieces to form an integral part with at least two color panels thereacross.

The molded part of the invention is a single-piece plastic shell formed from cast thermoplastic powder with two or more color panels joined by pin-stripe or common color connector means. The shell may be backed with a layer of reaction injection mold material or reinforced reaction injection mold material of urethane composition.

Other advantages and a more complete understanding of the invention will be apparent to those skilled in the art from the succeeding detailed description of the invention and the accompanying drawings thereof.

BRIEF DESCRIPTION OF DRAWINGS

FIG. 1 is a schematic view of a single-piece multi-color panel of the present invention shown with associated component parts of an automotive vehicle door panel;

FIG. 2 is an enlarged fragmentary sectional view of a pin-stripe or common color connector in the panel of FIG. 1;

FIG. 3 is a diagrammatically shown sectional view of a mold component of the inventive apparatus;

FIG. 4 is a diagrammatically shown sectional view of a powder box of the invention sealed to the mold of FIG. 3 in a pre-release position;

FIG. 5 is a sectional view like FIG. 4 showing the powder box and mold in a powder release orientation;

FIG. 6 is a diagrammatic sectional view of the mold with separately formed shell segments;

FIG. 7 is a view showing distribution of pin-stripe or common color material; and FIG. 8 is a diagrammatic sectional view of the mold with the pin-stripe or common color connector formed thereon.

DETAILED DESCRIPTION OF THE INVENTION

The process, apparatus and article of the present invention will be with reference to the production of plastic thin-walled shells for a typical automotive part such as an interior door panel, consoles and instrument panels.

FIG. 1 shows a typical automobile door panel application of a multi-color, single-piece interior plastic shell 10. The shell 10, preferably made of polyvinyl chloride material, is backed by a layer of polyurethane foam 12 bonded to the shell 10 by a mold process such as in U.S. Pat. No. 3,123,403, issued Mar. 3, 1964 for Automobile Arm Rest. An interior reinforcing insert 14 is connected at a joint 16 to an outer door shell 18 to form an interior space 20 for window lift mechanism (not illustrated) to raise and lower a window 22.

In accordance with the present invention the shell is a one-piece plastic part with an integral lower panel 24 of a drycast plastic having a first color. As best seen in FIG. 2, the shell 10 includes a pin-stripe or common color connector 26 of a selected connector color that has edges 28 and 30 that overlap and are bonded to an edge 32 of the lower panel 24 and a side edge 34 of an upper panel 36 including an armrest segment 38 formed of drycast plastic having a second color contrasting or complementing the color of the lower panel 24 or other interior components. For example, the upper panel can be red, blue, yellow or beige to contrast with or complement the interior color of seats, headliners, crashpads and the like. The lower panel 24 can be colored a deeper complementary tone color of a character which has a low impact or scuff display character. The pin-stripe connector can be a color complimentary to the colors of lower panel 24 and upper panel 36 or the same color as either of the panels.

Referring to FIGS. 2-4, a powder molding process line is schematically shown as including selectively heated mold 40. A powder box 42 is operated between raised and lowered positions with respect to the mold 40 by suitable handling equipment, one type of which is specifically set forth in co-pending U.S. Ser. No. 500,760 filed June 3, 1983 for Mold Loading Method and Apparatus.

The box 42 further includes an upper open end 44 which is configured to cover the planar extent of an opening 46 to mold 40.

Clamp means 48 join and seal the powder charge box 42 to mold 40 when the box 40 is elevated to the position shown in FIG. 4, hereinafter referred to as the "mold-inverted" position in which the mold cavity faces downwardly.

As joined, the interior of box 42 and the interior of mold 40 form a closed system 50 having separate powder charges in the box 42.

In accordance with the process and apparatus of the present invention, the box 42 is provided with a divider 52 with a seal gasket means 53 and the mold 40 has a rib 54 that contacts the seal 53 when the box and mold are joined.

The divider 52 and rib 54 form two separate compartments 56,58 each containing a charge of plastic powder material of a different color (color A in 56, color B in 58).

The next process step includes concurrent rotation of the closed system 50 about axis 60.

At FIG. 5 a dump step of the process takes place in which thermoplastic powder is distributed evenly throughout the mold opening 40. A resultant even build-up of plastic powder occurs on pre-heated surfaces 62,64 of the mold 40. The inverted mold position shown in FIG. 5 will hereinafter be referred to as the "mold-casting" position.

Following the fill step, the joined mold 40 and charge box 42 are again rotated 180° by rotation drive means 74 so that the mold 40 is located vertically above the box 42 in the mold-inverted position.

The charge box is removed from the inverted mold 40 and the box 42 is returned to a powder make-up position. The two separate thin wall parts are now visible.

Thereafter the mold 40 (with the powder cast to the surfaces 62,64) is rotated 180° into the mold-casting position shown in FIG. 6.

The FIG. 6 position represents a pin-stripe or common color connector formation station. At this point in the process edges 66,68 are separated by an exposed division surface 70 on the rib 54. The surface 70 is heated and is disposed to have a charge of plastic powder connector material distributed by suitable distributor means in the form of a spout 73 along its length. The connector materials also flow on to the backside surface of edges 66,68 to form a U-shaped pin-stripe connector 72 that bonds the separate parts of different color at a common joint formed by connector 72 and edges 66,68.

The molded and bonded part is then oven cured; the mold is cooled and the part is de-molded.

A typical powder casting process for a two-color door panel includes the following sequence.
1. Preheat tool.
2. After mold cast temperature is reached, attach the powder box to the mold.
3. Rotate box and mold.
4. Dwell period.
5. Unclamp.
6. Distribute pin-stripe or common color material against exposed, heated seal surface.
7. Return the mold to a cure oven and fuse.

Examples of suitable mold heating processes for use with the process and apparatus of the present invention include mold temperature control by heated and cooled air or oil heating and cooling flow as set forth in U.S. Pat. No. 4,217,325 issued Aug. 12, 1980 to D. Colby. Suitable thermoplastic powders include plasticized polyvinyl chlorides and related vinyl resins in dry powder form for ease of gravity flow from the powder charge box 60 during both fill and return steps. Typical examples of parts, plastic materials and mold processes include the following:

Examples of parts that have been made by the PVC powder molding process include a door panel shell having a mold volume of approximately six (6) cubic feet.

PVC resin, plasticizer, stabilizer, release agents and color pigments are combined in a high intensity mixer to produce a dry, flowable powder of each desired color. The process is known in the industry as dry-blending.

The various compound components may be selected as to type and ratio to provide the properties required both for the finished product and for ease of processing. Physical properties will not be too dissimilar from those obtained with liquid plastisol which is also used to manufacture similar products but has an inherent weakness for forming objectionable drips and runs when made in complex shapes.

Processing properties are such that when melting of the plastic powder occurs, densification results in exact reproduction of minute detail such as grain marks and stitches engraved in the mold surface.

Mold preheating temperature may range from 250° F. to 450° F. Since the thickness of the finished product is also governed by the time the powder contacts the mold, it should be understood that simultaneous charging of the powder to the mold can be of definite advantage. Also, if certain areas of the mold can be made to have a lower pre-heated temperature than others, it will permit molding a thinner shell in those areas, since both temperature and mold-filled time determine the final thickness of the shell. Therefore, a very flexible range, for mold-filled time, of one second to ten seconds or more has been established.

Depending on formulation, complete melting or fusion of the PVC powder can occur when mold temperatures reach 350° F. to 450° F.

After fusion, the mold is cooled to a temperature which will facilitate removal of the shell without damage.

Specifically the process and apparatus of the present invention enable even and complete distribution of thermoplastic powder material onto mold surfaces to form large, long, thin-walled single-piece two-color or more shells with a pin-stripe or common color connector bonded to each shell segment for forming a unitary part for interior door panels or instrument panels and the like formed during short cycle mold cycles in limited plant floor space.

While representative embodiments of apparatus and process of the present invention have been shown and discussed, those skilled in the art will recognize that various changes and modifications may be made within the scope and equivalency range of the present invention.

What is claimed is:

1. Apparatus for molding a thin-walled plastic shell in a heated open-ended mold from a charge of thermoplastic powder material in open-ended charge box means comprising: means for joining a mold and charge box means in open-ended relationship; co-acting means on the box means and the mold to define at least two separate molding surfaces on the mold; means for rotating the mold and charge box means so as to distribute separate charges of powder material against the separate molding surfaces of the mold, connector formation means including a style line molding surface on the mold separate from and raised with respect to said at least two separate molding surfaces, means including a divider on the charge box means and seal gasket means on said divider with a surface area complementary to said styling line molding surface and selectively engageable therewith to completely shield the styling line molding surface as material is distributed on the other casting surfaces; means for selectively separating said seal gasket means from said styling line molding surface to completely expose it, and means for distributing thermoplastic powder on the completely exposed style line molding material between the material previously molded on the separate molding surfaces to form a connector style line bonded therebetween.

2. In the apparatus of claim 1,
said charge box means including a single open-end box having at least one divider wall separating the box into first and second open end compartments each adapted to have a predetermined charge of plastic powder therein;
said mold having a rib with a flat styling line surface and rib edge surfaces; said flat styling line surface being located in close spaced relationship to and completely covered by said at least one divider wall when said charge box means is joined to said mold and said seal gasket means loacted between said rib and said divider to seal said separate molding surfaces on the mold that receive powder from the first and second open end compartments when the open-ended box and mold are joined and rotated to form separate shell segments on the mold with edges formed against said rib edge surfaces;
means for separating said mold from said charge box to expose said flat styling line surface and the backside of the shell segment edges; and said means for distributing thermoplastic powder including a spout for depositing the powder on the style line molding surface when the mold is separated from said charge box.

* * * * *